United States Patent [19]

Ishihara et al.

[11] Patent Number: 4,713,702
[45] Date of Patent: Dec. 15, 1987

[54] DATA COMMUNICATION APPARATUS

[75] Inventors: Mitsugu Ishihara; Yukihiko Machida, both of Shinagawa, Japan

[73] Assignee: Sony Corporation, Tokyo, Japan

[21] Appl. No.: 732,004

[22] PCT Filed: Sep. 5, 1984

[86] PCT No.: PCT/JP84/00425
§ 371 Date: May 6, 1985
§ 102(e) Date: May 6, 1985

[87] PCT Pub. No.: WO85/01168
PCT Pub. Date: Mar. 14, 1985

[30] Foreign Application Priority Data

Sep. 5, 1983 [JP] Japan ................. 58-163888

[51] Int. Cl.$^4$ ............. H04N 5/76; G11B 31/00; H04J 3/06
[52] U.S. Cl. ................. 360/79; 360/33.1; 358/149; 370/101
[58] Field of Search ............ 360/14.1, 14.2, 14.3, 360/15, 18, 20, 22, 27, 33.1, 35.1, 55, 69, 79; 358/335, 906, 149; 369/24; 370/29, 101

[56] References Cited

U.S. PATENT DOCUMENTS

| | | | |
|---|---|---|---|
| 3,755,628 | 8/1973 | Games et al. | 370/101 |
| 3,787,617 | 1/1974 | Fiori | 360/14.1 |
| 4,045,613 | 8/1977 | Walker | 370/101 |
| 4,052,566 | 10/1977 | MacKay | 370/101 |
| 4,067,049 | 1/1978 | Kelly et al. | 360/14.1 |
| 4,194,222 | 3/1980 | Ebbinga | 360/20 |
| 4,199,663 | 4/1980 | Herzog | 370/101 |
| 4,260,854 | 4/1981 | Kolodny et al. | 360/18 |
| 4,280,149 | 7/1981 | Bragas | 360/14.1 |
| 4,380,047 | 4/1983 | Eisenhard et al. | 360/15 |
| 4,450,487 | 5/1984 | Koide | 360/33.1 |
| 4,507,691 | 3/1985 | Ishiguro et al. | 360/14.3 |
| 4,555,735 | 11/1985 | Usuki et al. | 358/906 |
| 4,616,337 | 10/1986 | Sheth | 364/900 |

Primary Examiner—Donald McElheny, Jr.
Attorney, Agent, or Firm—Lewis H. Eslinger

[57] ABSTRACT

A data communication apparatus of a start-stop synchronizing system in which a bidirectional data communication between a master apparatus (10) and a slave apparatus (20) can be carried out through a single communication line (30). The transmission period of the master apparatus (10) and the transmission period of the slave apparatus (20) are formed as one block and this one block is repeated. Start signals $X_1$ and $X_2$ for use in transmitting and receiving data are transmitted only from the master apparatus (10). Since it is sufficient to provide a single communication line between the two apparatus, the construction of the system can be simplified.

9 Claims, 16 Drawing Figures

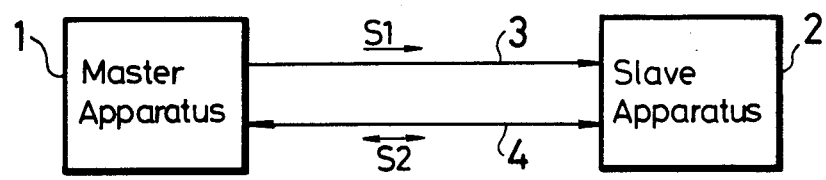
FIG. 1 PRIOR ART
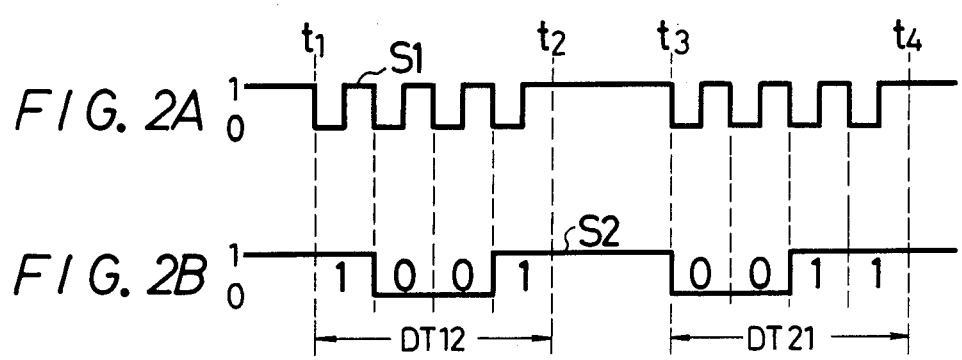
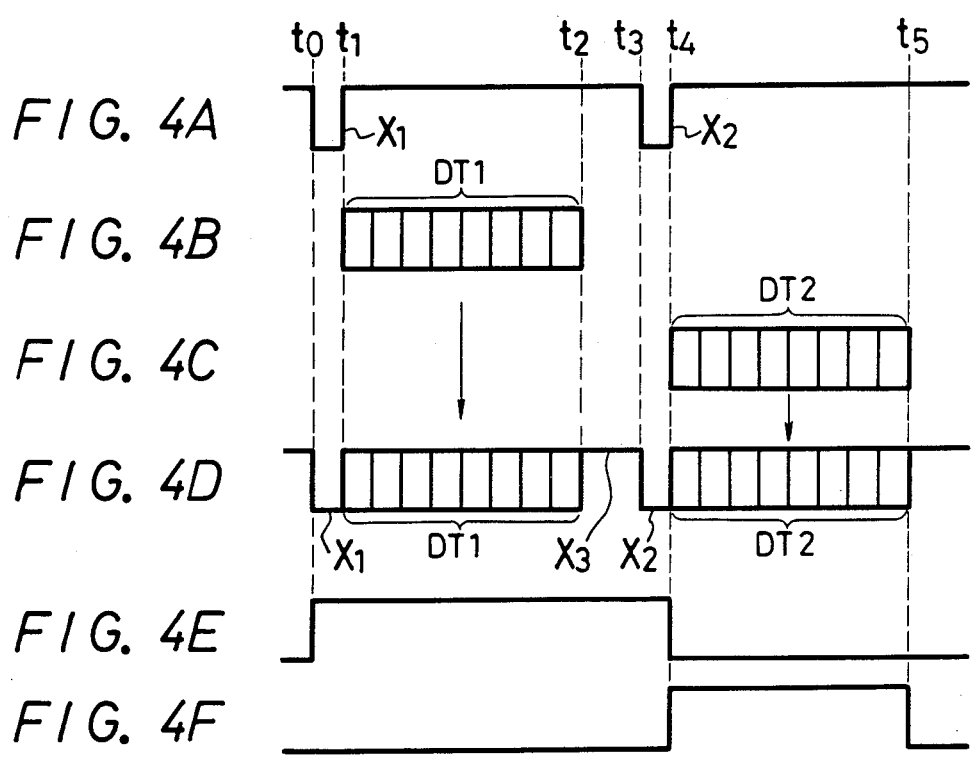

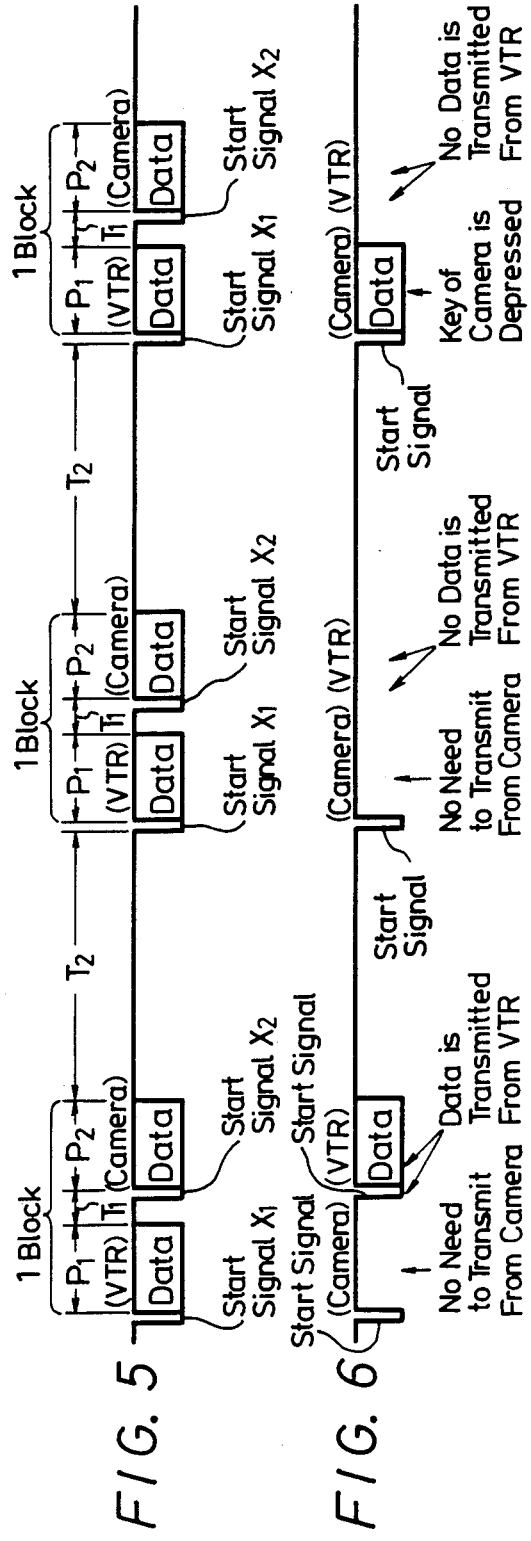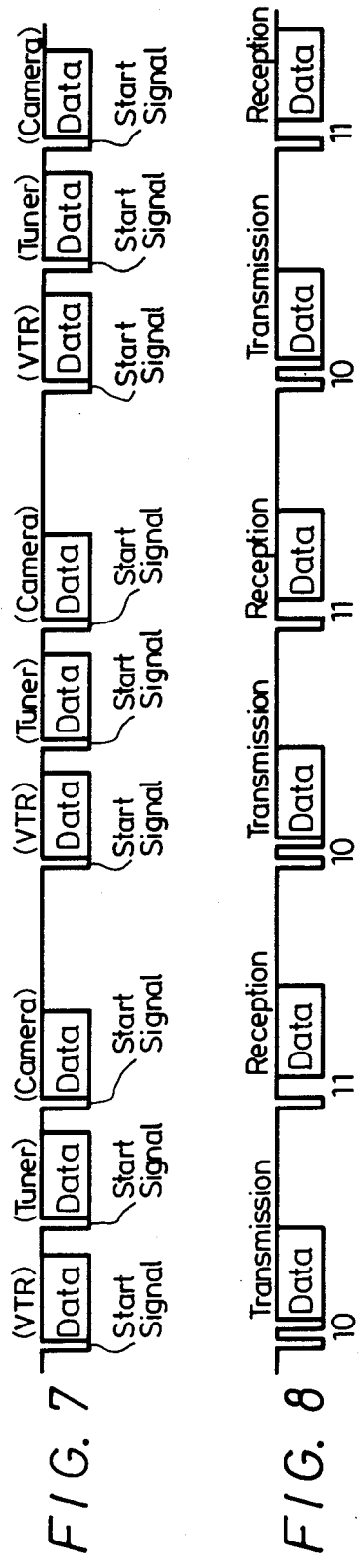

DATA COMMUNICATION APPARATUS

TECHNICAL FIELD

This invention relates to data communication apparatus and more particularly to a data communication apparatus in which a bidirectional data communication between two apparatus can be made by a single signal line.

BACKGROUND ART

When a video signal picked up by, for example, a video camera is recorded by a video tape recorder (VTR), in order to operate these two apparatus in synchronism with each other, if the VTR, for example, is used as a master apparatus and the video camera as a slave apparatus, data signals containing a control signal, a mode signal, an answer signal and the like must be interchanged therebetween. In such case, in the prior art, as shown in FIG. 1, two signal lines 3 and 4 are generally interconnected between a master apparatus 1 and a slave apparatus 2. Then, in order that through the first signal line 3, a clock signal S1 (FIG. 2A) is transmitted from the master apparatus 1 to the slave apparatus 2 and that in synchronism with this clock signal S1, a data signal S2 (FIG. 2B) is transmitted from the master apparatus 1 to the slave apparatus 2, a data signal DT12, of time points from $t_1$ to $t_2$ is transmitted from the master 1 to the slave 2 or, in the reverse direction, a data signal DT21 of time points from $t_3$ to $t_4$ is transmitted from the slave apparatus 2 to the master apparatus 1. In the case of FIG. 1, the level of the signal line 3 for the clock signal S1 is always maintained at logic level "1" so that during the interval $t_1$ to $t_2$ or the interval $t_3$ to $t_4$ in which each bit of the data signal DT12 or DT21 of, for example, 4 bits is transmitted, the level of this signal line falls down to logic "0" with a duty ratio of $\frac{1}{2}$.

As described above, in the prior art, in order that the data signal S2 may be positively interchanged between the two apparatus without being dropped, it is important that while the two apparatus are being operated in synchronism with each other by the common clock signal S1, the data is interchanged bit by bit therebetween so as to prevent the transmission and reception of the data signal S2 from being overlapped in time.

However, according to the circuit arrangement of FIG. 1, the two signal lines 3 and 4 must be provided and hence this puts a restriction on simplifying the circuit arrangement of the control system as the total system including two apparatus.

DISCLOSURE OF INVENTION

In this invention, when a bidirectional communication of data between a master apparatus and a slave apparatus is carried out through a single transmission line, a transmission period of one apparatus and that of the other apparatus are formed as one block and this one block is repeated. Within one block, the transmission period of one apparatus and that of the other apparatus can be discriminated from each other and one block and another one block can also be discriminated from each other. Accordingly, in this data communication apparatus, the transmission and reception of data are respectively carried out in timing by a start signal from the master apparatus side and at least a start signal used to transmit the data from the slave apparatus to the master apparatus is always transmitted from the side of the master apparatus to the side of the slave apparatus at a predetermined cycle.

According to the present invention as mentioned above, since the transmission from the master apparatus and the transmission from the slave apparatus are carried out under the condition that both transmissions are formed as one block, they are respectively carried out during different periods having the predetermined sequential orders within one block and by the start signal from the master apparatus, both of the transmission and the reception are started, and both transmission periods are never overlapped with each other. Further, upon transmitting data from the master apparatus to the slave apparatus, on the basis of the transmitted start signal, data can be latched in the slave apparatus, while upon transmitting data from the slave apparatus to the master apparatus, on the basis of the start signal generated from the master apparatus, data can be latched in the master apparatus. Accordingly, only by the single transmission line with the transmission line of the clock signal being omitted, the bidirectional communication between the master apparatus and the slave apparatus can be made.

BRIEF DESCRIPTION OF DRAWINGS

FIG. 1 is a block diagram of an example of a prior art data communication apparatus;

FIGS. 2A and 2B are a waveform diagram useful for the explanation thereof;

FIGS. 4A-4F and 5 are respectively timing charts useful for the explanation thereof;

FIGS. 6 to 8 are respectively timing charts useful for explaining another embodiment of this invention.

BEST MODE FOR CARRYING OUT THE INVENTION

Figure 3:
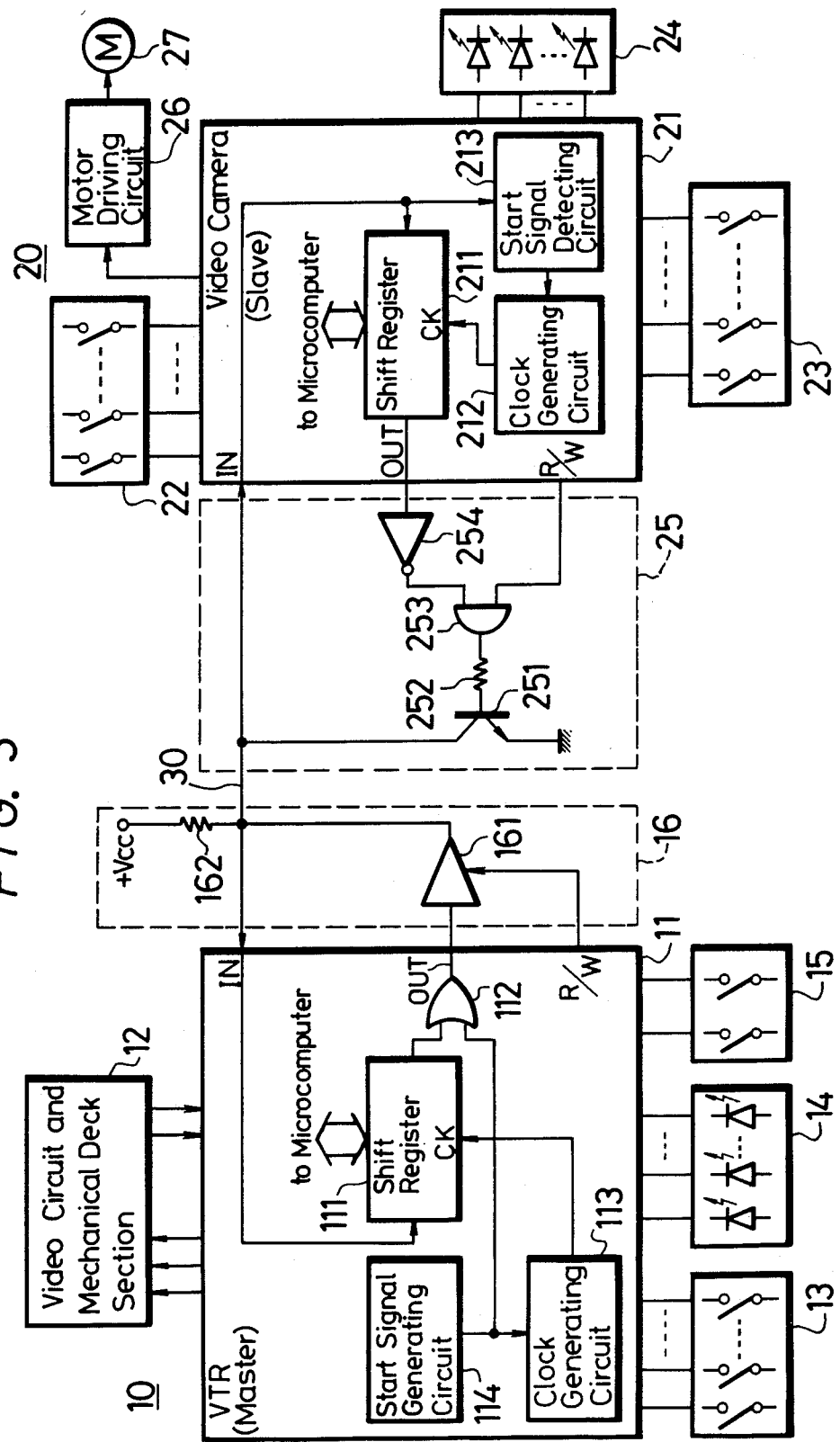
FIG. 3 is a block diagram showing an embodiment of a data communication apparatus according to this invention.

FIG. 3 illustrates an embodiment of this invention in which a VTR is a master apparatus and a video camera is a slave apparatus.

Referring to the figure, reference numeral 10 designates the VTR and 20 the video camera. The VTR 10 accommodates therein a microcomputer and comprises a communication control section 11 for carrying out the communication and other control operation, a video circuit and mechanical deck section 12, a function key section 13 of VTR, a VTR mode display section 14, a remote control function key section 15 for the video camera 20 and a transmitter-receiver 16. On the other hand, the video camera 20 accommodates therein a microcomputer and comprises a communication control section 21 for carrying out the communication and other control operation, a video camera function key section 22, a remote control function key section 23 for remote controlling the VTR 10, a display section 24 capable of display within, for example, a viewfinder and a transmitter-receiver 25. Reference numeral 26 designates a drive circuit of a zoom motor 27.

Reference numeral 30 designates a single communication line which is adapted to transmit a control signal between the VTR 10 and the video camera 20.

The function key section 13 of the VTR 10 is provided with function keys such as a record mode key, a playback mode key, a pause mode key, a fast forward mode key, a rewind mode key, a stop mode key and so on. When any one of these function keys is operated, the microcomputer of the control section 11 identifies the operated function key, which then is displayed on the display section 14. At the same time, the required control signal is supplied to the video circuit and mechanical video deck section 12, by which the VTR is set in the mode corresponding to the operated function key.

The remote control function key section 23 at the side of the video camera 20 is also provided with function keys such as a record mode key, a playback mode key, a pause mode key, a fast forward mode key, a rewind mode key, a stop mode key and so on. When any one of the function keys is depressed, as will be described later, from the side of the video camera 20, a control data is transmitted through the communication line 30 to the VTR 10, in which this control data is latched in the register in the microcomputer of the communication control section 11. As a result, on the basis of the content of the data and the state of the key input of the function key section 13 of the VTR 10, the mode of the VTR 10 is determined and the determined mode is displayed on the display section 14 and the necessary control signal is supplied to the video circuit and mechanical deck section 12, whereby to place the VTR in the determined mode. The reason why the mode of the VTR 10 is determined on the basis of the data transmitted from the video camera 20 and the state of the function key section 13 of the VTR 10 is to prevent misoperation. For example, since the fast forward mode is not set while the recording is made by the video camera, at this time, the command of the fast forward mode is ignored and the recording mode is continued. This operation is carried out by storing in the microcomputer a data which determines the next mode of the VTR 10 relative to the combination of the remote control signal and the mode of the function key.

From the VTR 10, a signal data indicative of the fact that the VTR is placed in the determined mode is transmitted to the side of the video camera 20, while the video camera 20 receives such signal data and then displays the mode of the VTR 10 in the display section 24 within the viewfinder.

The remote control function key section 15 of the VTR 10 for remote-controlling the video camera 20 includes function keys such as a focus key, an iris key, a zoom key, a pan key, a tilt key and so on. For example, when the zoom key is operated, as will be described later, a zooming data is transmitted through the communication line 30 from the VTR 10 to the video camera 20 in which the zooming data is latched in the register of the microcomputer of the communication control section 21 of the video camera 20 and the zooming data is supplied through the motor drive circuit 26 to the zoom motor 27, thus the zooming operation being carried out.

In the video camera 20 if the function key section 22 is operated, the operation corresponding to the above key operation is carried out by the video camera 20 on the basis of the signal from the microcomputer of the control section 21. For example, when the zoom key is operated in the video camera 20, the zooming operation is carried out.

The bidirectional communication is carried out through the single signal line 30 as follows.

The communication control section 11 of the VTR 10 is provided with a shift register 111 of, for example, 8 bits. An input terminal IN of this communication control section 11 is connected to the serial input terminal of this shift register 111 and the serial output terminal of this shift register 111 is connected through an AND gate 112 to an output terminal OUT of the communication control section 11. Between this shift register 111 and the data bus of the microcomputer, a data is written and/or read in the form of parallel data.

The serial data is latched in and/or read out from this shift register 111 on the basis of a clock pulse produced from a clock generating circuit 113. The clock generating circuit 113 produces 8 clock pulses when a start signal is produced from a start signal generating circuit 114.

The start signal from the start signal generating circuit 114 is supplied through the AND gate 112 to the output terminal OUT of the communication control section 11.

The output terminal OUT of the communication control section 11 is connected to an output amplifier 161 of the transmitter-receiver 16. The output terminal of the output terminal amplifier 161 is connected through a pull-up resistor 162 to, for example, a positive voltage source Vcc. Accordingly, under the state that the output amplifier 161 does not produce an output of logic "0", the level of the communication line 30 which is connected to the output terminal of the output amplifier 161 through the resistor 162 is pulled up to logic "1".

To the output amplifier 161, there is supplied a transmitting and receiving control signal RW1 from a terminal R/W of the communication control section 11. When the transmitting and receiving control signal RW1 is logic "1" in level, the VTR 10 is placed in the transmission mode and the output amplifier 161 is set in the enable state so that the output amplifier produces at its output terminal an output of a logic level corresponding to the change of the logic level of each bit of the data signal DT1 from the output terminal OUT of the communication control section 11, which then is transmitted to the communication line 30.

When, on the other hand, the transmitting and receiving control signal RW1 is logic "0" in level, the output amplifier 161 is set in the state of producing no output and the output impedance thereof is made at high level. Accordingly, under this state, if the logic level of the communication line 30 is changed, a data indicative of such change is applied to the input terminal IN of the communication control section 11 as an input signal thereof.

The communication control section 21 of the video camera 20 is provided with a shift register 211 of 8 bits for use in latching therein and transmitting the serial data. The serial input terminal of the shift register is connected to an input terminal IN of the communication control section 21 and the serial output terminal thereof is connected to an output terminal OUT of the communication control section 21, respectively. Then, 8 bit parallel data is interchanged between this shift register 211 and the data bus of the microcomputer.

The writing and/or reading of the serial data in and/or from the shift register 211 is carried out by a clock pulse generated from a clock generating circuit 212. This clock generating circuit 212 produces the clock pulse with the frequency same as that of the clock pulse generated from the clock generating circuit 113 at the side of the VTR 10. When the start signal transmitted from the side of the VTR 10 is detected in a start signal detecting circuit 213, this clock generating circuit produces 8 clock pulses.

The communication line 30 is connected through the transmitter-receiver 25 to the input terminal IN of the communication control section 21 of the video camera 20. The transmitter-receiver 25 includes a switching transistor 251 connected between the communication line 30 and the ground and the base thereof is supplied with an output of an AND gate 253 through a resistor 252. To the AND gate 253, there is supplied a transmitting and receiving control signal RW2 from a terminal R/W of the communication control section 21. When the transmitting and receiving control signal RW2 is logic "1" in level, the gate 253 is opened, whereby the transmission data DT2 supplied thereto from the output terminal OUT through an inverter 254 is supplied through the gate 253 to the base of the transistor 251. When the logic level of the data DT2 is "0", the transistor 251 is turned on to allow the communication line 30 to become the earth level, or logic "0" level. When, on the other hand, the data DT2 is logic "1" level, the transistor 251 is turned off so that the logic level of the communication line 30 becomes logic "1".

According to the circuit arrangement as mentioned above, the bidirectional communication between the VTR 10 used as the master apparatus and the video camera 20 used as the slave apparatus is carried out such that in this embodiment, as shown in FIG. 5, a combination of the transmission period $P_1$ for the data DT1 from the VTR 10 and the transmission period $P_2$ for the data DT2 from the video camera 20 is arranged as one block and this one block is cyclically repeated at every predetermined period. Further, a start signal corresponding to one bit amount in the beginning of each of the transmission data DT1 and DT2 is produced from the VTR 10 which is used as the master apparatus and this start signal is transmitted to the side of the video camera 20, thus on the basis of this start signal, the transmission and reception of data being carried out, or a data transmission of a start-stop synchronizing system being carried out.

In this case, in order to discriminate the transmission periods $P_1$ and $P_2$ of one block and the transmission periods $P_1$ and $P_2$ of another one block from each other, a period $T_1$ between the periods $P_1$ and $P_2$ of one block and a period $T_2$ between the blocks are made different from each other as $T_1 < T_2$. The period $T_2$ is selected to have a duration of time long enough in which the data processing is carried out in the VTR 10 and the video camera 20 and the operations corresponding to the data can be carried out.

In the case of this embodiment, the first transmission period $P_1$ is used as the transmission period of data from the VTR 10 and the second transmission period $P_2$ is used as the transmission period of the data from the video camera 20. From the start signal generating circuit 114 of the communication control section 11 of the VTR 10, there are repeatedly produced two start signals $X_1$ and $X_2$ at every predetermined cycle per block, respectively.

The communication of each one block is carried out as follows.

That is, as shown in FIG. 4A, from the start signal generating circuit 114 in the communication control section 11 of the VTR 10, there is produced the start signal $X_1$ which falls down to "0" by one bit amount from a time point $t_0$ and at this time point $t_0$, the transmitting and receiving control signal RW1 (FIG. 4E) developed at the terminal R/W becomes at high level so that the VTR 10 is set in the transmission mode. Then, at a time point $t_1$ after the time point $t_0$ with a delay of one bit, since the start signal $X_1$ rises up, the clock generating circuit 113 produces sequentially 8 clock pulses by which the transmission data DT1 of 8 bits stored in the shift register 111 is read out therefrom. Together with the start signal $X_1$, the data thus read out is transmitted through the AND gate 112 and the output amplifier 161 to the communication line 30 (see FIG. 4D).

At this time, since the transmitting and receiving control signal RW2 (FIG. 4F) of the communication control section 21 at the side of the video camera 20 is at low level, the video camera 20 is in the receiving mode and thence the start signal $X_1$ and the succeeding transmission data DT1 are applied through the input terminal IN to the communication control section 21. Then, the start signal $X_1$ is detected by the start signal detecting circuit 213 and from a time point at which the start signal $X_1$ rises up, 8 clock pulses are sequentially produced from the clock generating circuit 212 so that on the basis of the 8 clock pulses, the received data DT1 is written in the shift register 211.

The data DT1 latched in this shift register 211 is latched in the microcomputer through its data bus and hence a predetermined operation corresponding to the contents of data is carried out.

When the latching operation of the data DT1 in the shift register 211 is ended, the transmission data DT2 of 8 bits stored in another register is transferred to the shift register 211 in the form of a parallel data so as to be transmitted from the video camera 20 to the VTR 10.

On the other hand, when the transmission of the data DT1 is ended at time point $t_2$, from the output terminal OUT of the communication control section 11, an end signal $X_3$ of a predetermined bit number (for example, 2 bits) and which is at logic "1" in level is transmitted through the output amplifier 161 to the communication line 30, whereby to indicate the fact that the transmission of data DT1 to the side of the video camera 20 is ended. At time point $t_3$ after the end signal $X_3$, the start signal $X_2$ which once again falls down to logic "0" by one bit amount is produced from the start signal generating circuit 114 at the side of the VTR 10 and then it is transmitted through the output amplifier 161 to the communication line 30. Then, at time point $t_4$ at which the transmission of the start signal $X_2$ is ended, the transmitting and receiving control signal RW1 at the terminal R/W of the communication control section 11 at the side of the VTR 10 becomes at low level so that the VTR 10 is set in the receiving mode, while the transmitting and receiving control signal RW2 at the terminal R/W of the communication control section 21 at the side of the video camera 20 becomes at high level so that the video camera 20 is set in the transmitting mode.

Then, the start signal $X_2$ is detected by the start signal detecting circuit 213 whereby from the time point $t_4$, 8 clock pulses are sequentially produced from the clock generating circuit 212. On the basis of the clock pulses, the transmission data DT2 stored in the shift register 211 is transmitted through the output terminal OUT and the transmitter-receiver 25 to the communication line 30.

Since at this time the VTR 10 is in the receiving mode as earlier noted, this data DT2 is applied through this input terminal IN to the communication control section 11. In this communication control section 11, when the second start pulse $X_2$ is produced from the start signal generating circuit 114, from the time point $t_4$ at which this start pulse $X_2$ rises up, 8 clock pulses are sequentially produced from the clock generating circuit 113. On the basis of this clock pulse, the transmission data DT2 of 8 bits from the video camera 20 is written in the shift register 111. Then, the data DT2 thus written is latched in the microcomputer through its data bus in the form of 8-bit parallel data and then decoded to thereby carry out the predetermined operation corresponding to the contents of the data.

In like manner, the transmission period of the VTR 10 and the transmission period of the video camera 20 are arranged as one block and this one block is periodically repeated hereinafter.

The above-described operations will be executed in accordance with the following programs stored in the respective microcomputers of the VTR 10 and the video camera 20.

Figure 9:
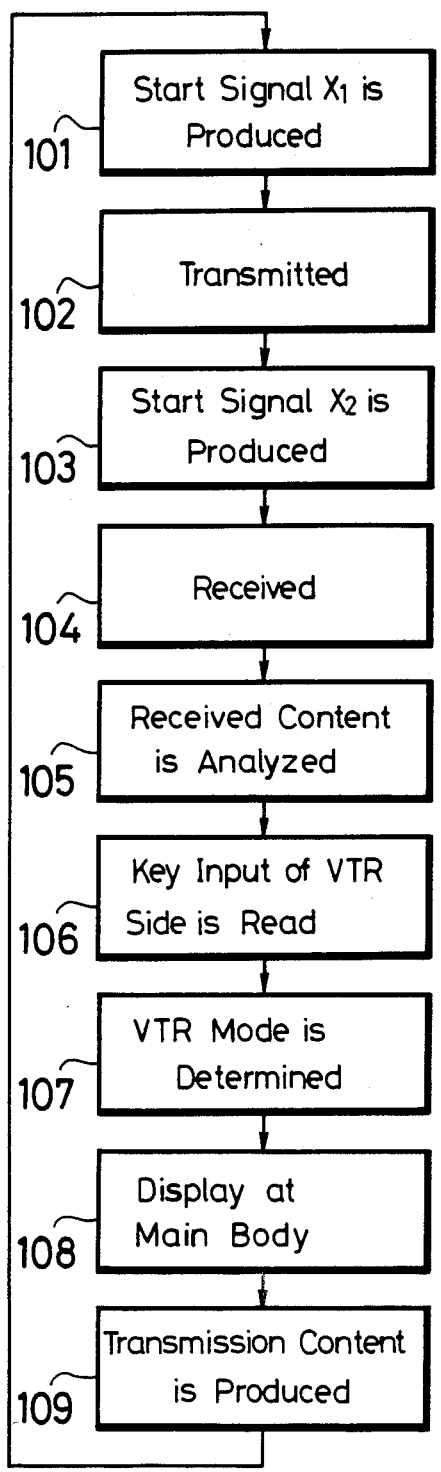
FIGS. 9 and 10 are respectively flow charts of a main part of the embodiment of this invention in FIG. 3.

That is, FIG. 9 is a flow chart of a program at the side of the VTR 10, in which steps 101 to 109 are repeated in turn. Steps 105 to 107 are steps in which as mentioned before, either of the commands from the video camera 20 and the key operation in the VTR 10 is preferentially selected so as to determine the mode of the VTR 10 and to prevent the mis-operation.

In step 109 for generating the transmission content, in addition to the data corresponding to the key input operation at the side of the VTR 10 and the data indicative of the mode of the VTR 10 set by the remote control signal from the side of the video camera 20, when there are neither commands or information indicative of mode to be transmitted to the side of the video camera 20, a data indicative of "no operation will be made" is formed and then transmitted.

Figure 10:
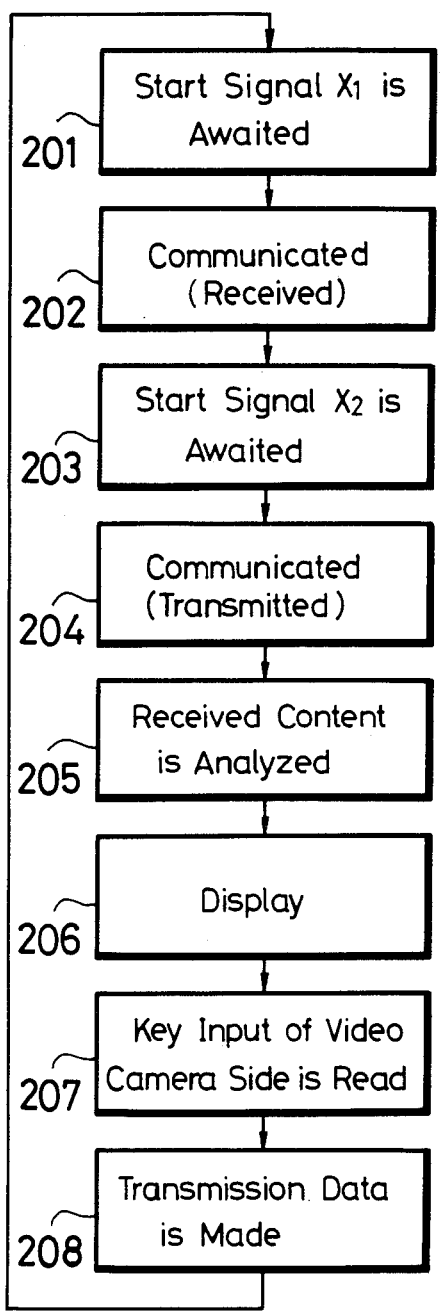

FIG. 10 is a flow chart of the program at the side of the video camera 20, in which steps 201 to 208 are repeated sequentially. In this case, in step 208, a transmission data is formed and then stored in the register until the start signal $X_2$ arrives. Then, when this start signal arrives, this data is transmitted in step 204.

The generation of the start signals $X_1$ and $X_2$ and the generation of the clock pulse in the communication control section 11 and the detection of the start signal and the generation of the clock pulse in the communication control section 21 may be carried out under the control of the microcomputer or by a hardware which is provided independently of the microcomputer.

In the above-described embodiment, since the first period $P_1$ of the transmission period of one block is assigned to the transmission period of the VTR 10 used as the master apparatus and the succeeding period $P_2$ is assigned to the transmission period of the video camera 20 used as the slave apparatus, the start signals $X_1$ and $X_2$ are both transmitted from the side of the VTR 10 periodically. On the contrary, if the first period $P_1$ is assigned to the transmission period of the slave apparatus and the succeeding period $P_2$ is assigned to the transmission period of the master apparatus, as shown in FIG. 6, concerning the start signal, only the first start signal $X_1$ is always transmitted periodically and only when the transmission data is transmitted from the master apparatus, the second start signal $X_2$ can be transmitted.

Further, this invention can be applied to such a case that there are one master apparatus and two or more slave apparatus. For example, when the master apparatus is the VTR and the slave apparatus is a tuner and a camera, as shown in FIG. 7, this can be realized by assigning the first transmission period to the transmission period of the VTR, the second transmission period to the transmission period of the tuner camera and the last transmission period is assigned to that of the camera.

The adjacent one blocks and the transmission periods $P_1$ and $P_2$ within one block can be discriminated from one another not only by the difference between the time periods as in the above-described example but also by inserting, as shown in FIG. 8, an identifying code of "10" and an identifying code "11" before the data of the transmission period and the reception period as seen from one apparatus.

What is claimed is:

1. A data communication apparatus, in which a bidirectional communication of data is carried out between a master apparatus and a slave apparatus, comprising: a single signal line forming a sole connection between said master apparatus and said slave apparatus, means for arranging a first data transmission period of one apparatus and a second data transmission period of the other apparatus as one block with a first blank period between said first and second data transmission periods containing a start signal from said master apparatus and no data and with a second blank period between successive blocks in which no data except a start signal from said master apparatus is transmitted or received, means for discriminating said transmission period of said one apparatus and said transmission period of said other apparatus from each other and for discriminating said one block from subsequent other blocks, means for controlling the timing of the transmission and reception by said start signal from said master apparatus for use in transmitting a data from said slave apparatus to said master apparatus, in which said start signal is periodically transmitted only from the side of said master apparatus to the side of said slave apparatus prior to the respective starts of said first and second data transmission periods.

2. A data communication apparatus as claimed in claim 1, in which said means for discriminating performs a discrimination between said data transmission period of said one apparatus and said data transmission period of said the other apparatus and a discrimination between said blocks are respectively carried out by detecting a difference between said first blank period between a transmission period and a reception period and said second blank period between said successive blocks.

3. A data communication apparatus claimed in claim 1, in which said means for discriminating performs a discrimination between said first and second blank periods by inserting discrimination codes in addition to said start signal in said blank period between successive blocks before a transmitting data and a receiving data.

4. A data communication apparatus as claimed in claim 1, in which said transmission period of said one apparatus is always assigned to a transmission period of said master apparatus and said transmission period of said the other apparatus is always assigned to a transmission period of said slave apparatus.

5. A data communication apparatus as claimed in claim 1, in which said means for arranging a transmission period includes means for assigning a first data period of said one block to said master apparatus and a second data period of said one block to said slave apparatus.

6. A data communication apparatus as claimed in claim 1, in which said means for arranging a transmission period includes means for assigning a first data period of said one block to said slave apparatus and a second data period of said one block to said master apparatus.

7. A data communication apparatus as claimed in claim 1, in which said master apparatus is a recording apparatus and said slave apparatus is a signal source of a recording signal.

8. A data communication apparatus as claimed in claim 1, in which said master apparatus is a reproducing apparatus and said slave apparatus is a processing apparatus for a signal to be reproduced.

9. A data communication apparatus as claimed in claim 1, in which said master apparatus is a recording and reproducing apparatus and said slave apparatus is a control apparatus thereof.

* * * * *